K. E. PORTER.
SECTIONAL GEAR.
APPLICATION FILED NOV. 16, 1908.

914,071.

Patented Mar. 2, 1909.

Witnesses
C. M. Fahnestock
Bessie A. Beall.

Inventor
Kenneth E. Porter
By Alfred M. Allen
Attorney

THE NORRIS PETERS CO., WASHINGTON, D. C.

UNITED STATES PATENT OFFICE.

KENNETH E. PORTER, OF CINCINNATI, OHIO.

SECTIONAL GEAR.

No. 914,071.      Specification of Letters Patent.      Patented March 2, 1909.

Application filed November 16, 1908. Serial No. 462,834.

*To all whom it may concern:*

Be it known that I, KENNETH E. PORTER, a citizen of the United States, residing in Cincinnati, county of Hamilton, and State of Ohio, have invented certain new and useful Improvements in Sectional Gears, of which the following is a full, clear, and exact description, reference being had to the accompanying drawings, forming part of this specification.

My invention relates to gear wheels more particularly for use as transmission gears for traction cars and the like, in which segmental rims are provided arranged to be attached to the body of the wheel, and adapted to be removed and replaced when worn without the necessity of removing the entire wheel.

The object of my invention is to provide a construction in which the gear segments may be readily and easily attached and at the same time so effectively secured that there shall be no liability to wear loose at the joints or shift in position under the transmission strains.

Figure 1:
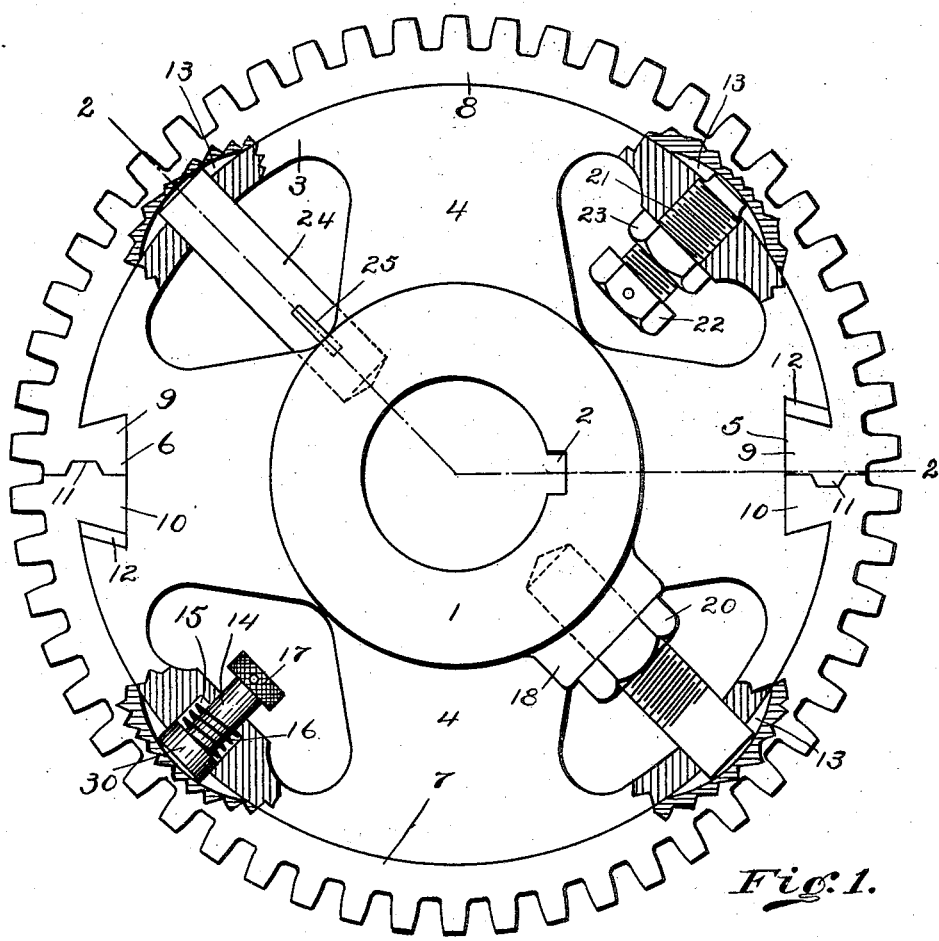
Figure 2:
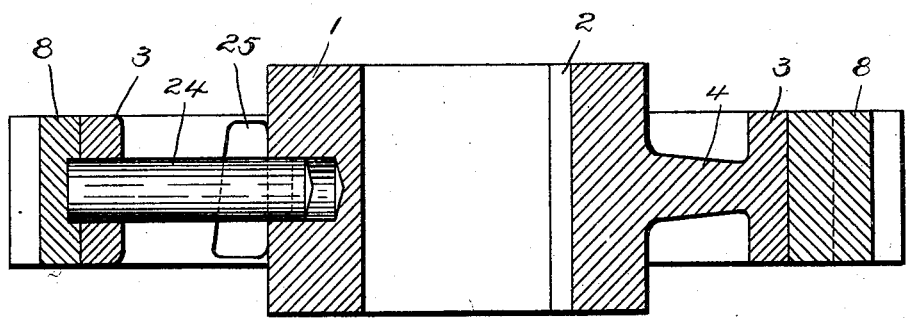

In the drawings Figure 1 is a side elevation partly in section of my improved construction. Fig. 2 is a cross section taken on the lines 2, 2, of Fig. 1.

1 is the hub of the gear provided with a key way 2, for securing same on the shaft.

3 is the rim of the wheel integrally supported with the hub by the massive spokes or radial arms 4, 4.

In the illustration of my construction in the drawings I have provided for a segmental gear in two parts, but, of course, as many sections as desired may be provided.

For securing semicircular sections, I form the two transverse dovetailed grooves 5, 6, at opposite points in the periphery of the solid rim 3, while each of the gear segments 7, 8, are provided with the dovetailed tenons 9, 9, and 10, 10 to fit within the grooves 5, 6. The abutting faces of the gear sections are also tongued and grooved at 11, to fit together to hold the sections more effectually to the rim and the grooves 5, 6, are somewhat wider than the tenons 9 and 10 and tapered soft steel wedges or keys 12, 12, are then driven in to wedge the sections together, the keys when driven being bent over to hold them in place.

To hold the gear sections from lateral displacement a series of slots 13, 13, are milled in the inner face of the gear segments and pins or bolts are provided mounted on the wheel rim 3, and arranged to engage these slots, the slots being cut of the width of the retaining pins. These slots are cut lengthwise of the periphery of the gear segments, so that while holding against any lateral movement, the segments can shift on the face of the rim in driving home the wedges or keys for the gear tenons. If the retaining pins were arranged to engage slots of the same dimensions as the pins, the segments would be held by the pins and the segments might not be keyed tightly to the wheel rim.

I have illustrated in the drawings several different methods of securing these retaining pins.

In the construction which I deem for some reasons to be preferable, a pin 14 is mounted in a radial opening in the rim 3. This pin has an enlarged head 30 seated in the socket 15 with a coiled spring 16 bearing between the head 15 and the base of the socket. When the pin is inserted in its seat a milled head 17 is pinned on for convenience in withdrawing the pin to release the gear section. This construction I consider preferable, as the coiled spring will maintain the engagement of the pin in the slot, without the necessity of the adjustment of any nut or other device. Instead of this construction I may provide a screw threaded socket in a boss 18, on the hub and insert a screw threaded bolt 19, through the opening in the rim and hold the bolt in position engaging the slot, by the nut 20. Or a simple set screw construction may be employed in which 21 is the set screw inserted for lack of space through the face of the rim and then having the head 22 pinned thereto. In this construction I make use of the nut 23 as a lock nut.

In still another construction I provide a simple bolt 24 with a slot 25 for a steel wedge 26, to be driven in to force the bolt into engagement with the slot in the gear section.

It will be noticed that with my construction I dispense with the use of nuts and bolts to securely fasten the gear sections to the rim 3. The retaining pins engaging the slots in the inner face of the gear sections being withdrawn, and the steel wedges being driven out, the sections can be slipped off laterally without in any way disturbing the pinion engaging the gear and new sections can be readily placed in position and keyed to the rim without the slightest difficulty.

Having thus described my invention what I claim as new and desire to secure by Letters Patent, is:

1. In a device of the character specified, a wheel body having an integral rim and a plurality of detachable toothed rim segments to engage the face of the wheel rim and wedges to secure the segments in place on the wheel rim, substantially as described.

2. In a device of the character described, a wheel body, provided with a plurality of dovetailed grooves transverse of the periphery of the wheel, and a plurality of detachable toothed rim segments provided with abutting dovetailed tenons to engage said grooves, and keys to wedge said tenons in place, substantially as described.

3. In a device of the character described, a wheel body, provided with a plurality of dovetailed grooves transverse of the periphery of the wheel, and a plurality of detachable toothed rim segments, provided with abutting dovetailed tenons to engage said grooves, and keys to wedge said tenons in place, and means to prevent lateral displacement of the rim segments, substantially as described.

4. In a device of the character described, a wheel body, provided with a plurality of dovetailed grooves transverse of the periphery of the wheel, and a plurality of detachable toothed rim segments, provided with abutting dovetailed tenons to engage said grooves, and keys to wedge said tenons in place, the abutting faces of the dovetailed tenons being transversely grooved and tenoned to fit within each other and prevent radial displacement, substantially as described.

5. In a device of the character described, a wheel body, provided with a plurality of dovetailed grooves transverse of the periphery of the wheel, and a plurality of detachable toothed rim segments, provided with abutting dovetailed tenons to engage said grooves, and keys to wedge said tenons in place, the inner faces of the rim segments being provided with slots with adjustable pins mounted on the wheel body to engage said slots to prevent lateral displacement of the rim segments.

6. In a device of the character described, a wheel body, provided with a plurality of dovetailed grooves transverse of the periphery of the wheel, and a plurality of detachable toothed rim segments, provided with abutting dovetailed tenons to engage said grooves, and keys to wedge said tenons in place, the inner faces of the rim segments being provided with slots, and spring pressed pins mounted in the wheel rim to engage said slots to prevent lateral displacement of the rim segments.

KENNETH E. PORTER.

Witnesses:
BESSIE A. BEALL,
R. P. AARGITT.